United States Patent [19]

Gollub et al.

[11] Patent Number: 4,577,988
[45] Date of Patent: Mar. 25, 1986

[54] BALL JOINT

[75] Inventors: Erwin Gollub, Neuss; Reinhardt Muller, Krefeld, both of Fed. Rep. of Germany

[73] Assignee: TRW Ehrenreich GmbH & Co., KG, Dusseldorf, Fed. Rep. of Germany

[21] Appl. No.: 634,709

[22] Filed: Jul. 26, 1984

[30] Foreign Application Priority Data

Jul. 27, 1983 [DE] Fed. Rep. of Germany ....... 3326960

[51] Int. Cl.[4] ............................................. F16C 11/00
[52] U.S. Cl. ..................................... 403/140; 403/135
[58] Field of Search ........................ 403/140, 135, 122

[56] References Cited

U.S. PATENT DOCUMENTS

| | | | |
|---|---|---|---|
| 3,856,423 | 12/1974 | Uchida | 403/140 |
| 3,967,907 | 7/1976 | Schmidt | 403/140 X |
| 4,353,660 | 10/1982 | Parks | 403/140 X |

FOREIGN PATENT DOCUMENTS

| | | |
|---|---|---|
| 2326018 | 8/1974 | Fed. Rep. of Germany . |
| 2434490 | 9/1975 | Fed. Rep. of Germany . |
| 1561691 | 2/1969 | France . |
| 2365720 | 5/1978 | France .................. 403/140 |
| 2387375 | 11/1978 | France . |

Primary Examiner—Andrew V. Kundrat
Attorney, Agent, or Firm—Yount & Tarolli

[57] ABSTRACT

The subject of the invention is a ball joint for motor vehicles, with two substantially hemispherical bearing shells (4, 5), set between a joint housing (1) and a ball head (3), of which the inner has on its outer side several ridges (8) for support in the joint housing (1). To simplify the mounting of the ball joint and to produce flat lubricant pockets (9) on the inner side of the inner bearing shell (4), it is proposed that the wall thickness (S1) of the inner bearing shell (4), designed in one piece, be greater, in the zone of the ridges (8) than the gap width between the joint housing (1) and the ball head (3), and that the wall thickness (S2), in the zone between the ridges (8), be equal to or less than half the wall thickness (S1) in the zone of the ridges (8), the inner bearing shell (4) being made of a soft-elastic plastic and the outer bearing shell (5) being made of a hard-elastic plastic.

3 Claims, 2 Drawing Figures

BALL JOINT

The subject of the invention is a ball joint for motor vehicles, with two substantially hemispherical bearing shells, set between a joint housing and a ball head, of which the inner bears on its outer side several ridges for support in the joint housing.

From German Pat. No. 2,434,490 there is known a grease-lubricated ball joint with a bearing shell which is formed of two hemispherical bearing shells, of which the inner bearing shell is designed in two parts and has on its outer side several ridges for support in the joint housing. Into the bearing shell of soft elastic plastic provided with the ridges, is set a thin inner shell of hard elastic plastic, without lubricant grooves. Through this merely local support of the ridges against the joint housing, the bearing surface of the bearing shell lying below is differently deformed locally and, indeed, so that the bearing play (or grease film) is least at those places of the bearing surface, above which the ridges lie. This means the formation of lubricant pockets in the intermediate zone, and a soft transition from the intermediate zone to the bearing zone. To attain this result, with the known ball joints, the two bearing shells, engaging with each other, of soft-elastic and hard-elastic plastic must first be joined with each other and then mounted in the joint housing together with the second hemispherical bearing shell and the ball journal. In all, therefore, with this known ball joint, three hemispherical bearing shells are needed.

From German Disclosure No. 2,326,018, a ball joint is known, in which a one-piece bearing shell, made of a self-lubricating plastic, is used, which in the zone of the equatorial plane of the ball head has a ring-form pocket to receive a supply of lubricant, so that the spherical ball head is supported by a pair of upper and lower bearing zones of the bearing shell. With this known ball joint, the ball head, through the ring-form pocket, has in the equatorial plane greater play than in the direction running orthogonal to this.

Starting from this, the invention attacks the problem of improving the known ball joints of the kind mentioned, so that, with the use of only two hemispherical bearing shells, the flat lubricant pockets already known are formed below the inner bearing shell provided with ridges, without the development of the lubricant film being impaired or a greater bearing play resulting in one direction.

For the technical solution of this problem, it is proposed that the wall thickness of the inner bearing shell, designed in one piece, be greater in the zone of the ridges than the gap width between the joint housing and the ball head, and that the wall thickness of the inner bearing shell, in the zone between its ridges, be equal to or less than half the wall thickness in the zone of the ridges, the inner bearing shell being made of a soft-elastic plastic, and the outer bearing shell of a hard-elastic plastic.

In a ball joint designed according to the invention, the inner bearing shell, in the mounting, is preclamped, in the zone of its ridges, between joint housing and ball head. With this, a slight forcing of material into the zones between the ridges is produced, which effects a lifting of the intermediate zones, with formation of flat lubricant pockets. For the inner bearing shell there is suitably used a soft-elastic plastic, for example, polyurethane, while the other, outer, bearing shell consists of hard elastic plastic, for example polyoxymethylene. In a ball joint produced according to this technical instruction, for the production of the flat lubricant pockets, already known, through the over-dimensioning of the ridge thickness according to the invention, only two spherical bearing shells are necessary, which must be mounted together with the ball journal. In this way, there is eliminated the production, still necessary with the known ball joint, of the third bearing shell and its premounting with the ridged, inner bearing shell.

Other details and advantages of the subject of the invention are given from the description which follows, with the respective drawings. In the drawings.

Figure 1:
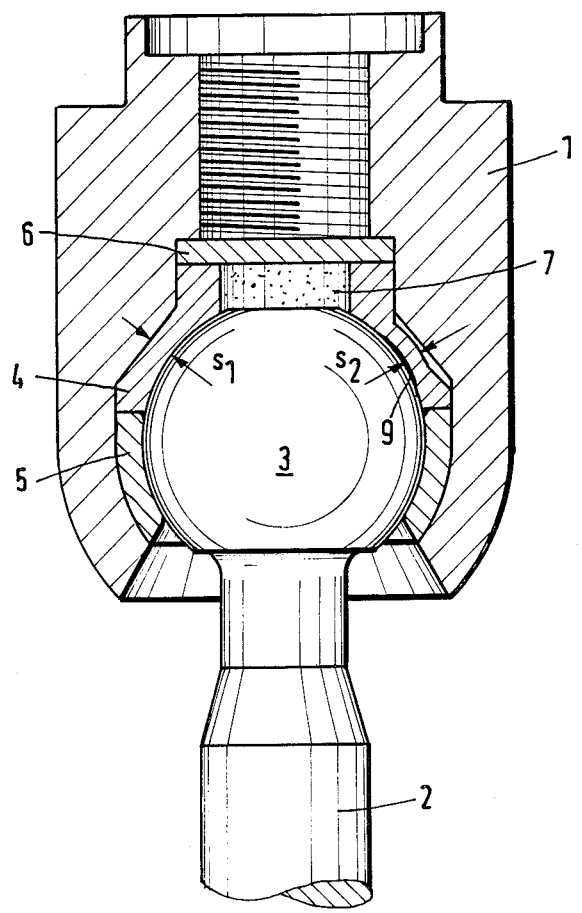
FIG. 1 shows a ball joint in mounted condition and in longitudinal section.
Figure 2:
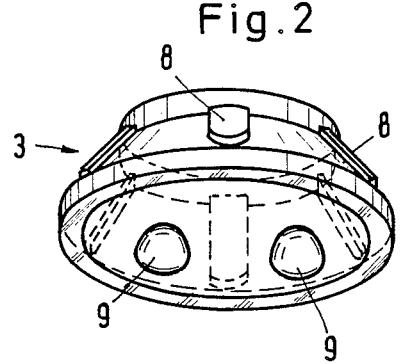
FIG. 2 shows in perspective an inner bearing shell provided with ridges.

Into a joint housing 1 is set a ball journal 2 by its ball head 3, with the interposition of an inner hemispherical bearing shell 4 and an outer hemispherical bearing shell 5. Between the inner bearing shell 4 and the joint housing 1, there is also a flat disc 6, so that the hollow space between the ball head 3 and this disc can be used as a grease reservoir 7.

The inner bearing shell 4 is provided on its outer side with ridges 8, arranged spaced apart from each other, by which it is supported against the joint housing 1. The wall thickness S1 of the bearing shell 4 in the zone of these ridges 8, is slightly greater, in the unmounted condition, than the gap width between the joint housing 1 and the ball head 3 in this zone. In this way, the ridges 8 are prestressed, in the mounting, against this bearing zone. With this, there takes place a forcing of material into the zones between the ridges 8, in which the wall thickness S2 of the bearing shell 4 is only about half as great as in the ridge zone. As a result of the forcing out of material from two neighboring ridges 8, the intermediate zones of the bearing shell 4 are lifted off, in the direction of the joint housing 1, and form flat lubricant pockets 9, which, with the movement of the ball head 3, are filled with grease from the grease reservoir 7. Since the lubricant pockets 9 have a very flat transition to the bearing zone under the ridges 8, a tearing of the lubricant film, such as can be observed with machined lubricant grooves, is not a problem.

What is claimed is:

1. A ball joint comprising:
   a housing,
   a ball stud having a ball head disposed in said housing,
   two substantially semispherical bearing shells interposed between said housing and said ball head, one of said bearing shells being composed of a soft elastic material and the other of said bearing shells being composed of a hard elastic material,
   said bearing shells having inner surfaces at least partially engaging said ball head,
   said one bearing shell having ridges formed on an outer surface thereof and elastically engaging the wall of said housing, and
   the wall thickness of said one bearing shell in zones between said ridges being one half or less than the wall thickness of said one shell in zones of said ridges so that lubricant pockets are formed between the inner surface of said one shell and said ball head in the zones between said ridges when said ridges elastically engage the wall of said housing upon initial preloading thereof.

2. A ball joint comprising:

a housing, a ball stud having a ball head disposed in said housing and a shank portion projecting from said housing, bearing shell means interposed between said ball head and a wall of said housing, said bearing shell means comprising a substantially semispherical inner shell disposed on substantially one side of the equatorial plane of said ball head and remote from said shank portion, said inner bearing shell being composed of a soft elastic material and having an inner surface at least partially engaging said ball head, and a substantially semispherical outer bearing shell disposed on substantially the side of the equatorial plane of said ball head opposite said one side and adjacent said shank portion, said outer bearing shell being composed of a hard elastic material, and means forming lubricant pockets between said inner surface of said inner bearing shell and said ball head in response to preloading of said bearing shell, said means comprising ridges formed on an outer surface of said inner shell.

3. A ball joint as set forth in claim 2 wherein the combined thickness of the wall of said inner shell and a ridge is two times or more than the wall thickness of said inner shell in zones between said ridges, said ridges engaging the wall of said housing and being distorted upon preloading of said bearing shell to form said lubricant pockets.

* * * * *